(12) United States Patent
Hsieh et al.

(10) Patent No.: US 11,572,942 B2
(45) Date of Patent: Feb. 7, 2023

(54) HARMONIC SPEED REDUCER

(71) Applicant: MAIN DRIVE CORPORATION, Hsinchu (TW)

(72) Inventors: Kun-Ju Hsieh, Hsinchu (TW); Chang-Lin Lee, Hsinchu (TW); Tung-Yu Li, Hsinchu (TW); Ching-Huei Wu, Hsinchu (TW)

(73) Assignee: MAIN DRIVE CORPORATION, Hsinchu (TW)

( * ) Notice: Subject to any disclaimer, the term of this patent is extended or adjusted under 35 U.S.C. 154(b) by 0 days.

(21) Appl. No.: 17/568,674

(22) Filed: Jan. 4, 2022

(65) Prior Publication Data

US 2022/0243797 A1 Aug. 4, 2022

Related U.S. Application Data

(60) Provisional application No. 63/145,481, filed on Feb. 4, 2021.

(30) Foreign Application Priority Data

Nov. 4, 2021 (TW) .................................. 110141063

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001

(Continued)

(56) References Cited

U.S. PATENT DOCUMENTS 4,974,470 A * 12/1990 Ishikawa ............... F16H 49/001
74/640
8,028,603 B2 * 10/2011 Ishikawa ............. F16H 55/0833
475/180

(Continued)

FOREIGN PATENT DOCUMENTS

DE 102005029591 A1 1/2007
DE 102020128776 A1 6/2021

(Continued)

OTHER PUBLICATIONS

Search Report dated Jun. 22, 2022 for EP application No. 22150665.2.

*Primary Examiner* — Ha Dinh Ho
(74) *Attorney, Agent, or Firm* — Li & Cai Intellectual Property Office

(57) ABSTRACT

A harmonic speed reducer is provided. The harmonic speed reducer includes a wave generator, a flexible gear, a first rigid gear, and a second rigid gear. The wave generator can be driven to rotate relative to a central axis. The flexible gear has a plurality of first outer gear structures, a division groove, and a plurality of second outer gear structures. The first rigid gear has a plurality of first inner gear structures configured to be engaged with the first outer gear structures. The second rigid gear has a plurality of second inner gear structures configured to be engaged with the second outer gear structures. A first intersection line is defined between each of the first inner gear structures and a sectional surface. An angle between the first intersection line and a first horizontal line is within a range from 0.1 degrees to 5 degrees.

8 Claims, 13 Drawing Sheets

(58) Field of Classification Search
USPC .......................................................... 74/640
See application file for complete search history.

(56) References Cited

U.S. PATENT DOCUMENTS

| | | |
|---|---|---|
| 9,470,301 B2 * | 10/2016 | Kuo ...................... F16H 49/001 |
| 10,253,863 B2 | 4/2019 | Kiyosawa et al. |
| 2008/0173130 A1 * | 7/2008 | Zhang .................. F16H 49/001 |
| | | 74/640 |
| 2009/0139358 A1 * | 6/2009 | Ishikawa ................ G01B 5/202 |
| | | 74/462 |
| 2011/0088496 A1 * | 4/2011 | Cho ...................... F16H 49/001 |
| | | 74/411 |
| 2015/0114174 A1 | 4/2015 | Roopnarine |
| 2020/0173532 A1 | 6/2020 | Shirokoshi |

FOREIGN PATENT DOCUMENTS

| | | |
|---|---|---|
| EP | 3196507 A1 | 7/2017 |
| JP | 2009133414 A | 6/2009 |
| TW | 201612438 A | 4/2016 |
| TW | 201920844 A | 6/2019 |
| TW | M625103 U | 4/2022 |

\* cited by examiner

HARMONIC SPEED REDUCER

CROSS-REFERENCE TO RELATED PATENT APPLICATION

This application claims the benefit of priority to Taiwan Patent Application No. 110141063, filed on Nov. 4, 2021. The entire content of the above identified application is incorporated herein by reference.

This application claims priority to the U.S. Provisional Patent Application Ser. No. 63/145,481 filed on Feb. 4, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a speed reducer, and more particularly to a harmonic speed reducer having two rigid gears.

BACKGROUND OF THE DISCLOSURE

Reference is made to FIG. 1, which is a partial cross-sectional view of a conventional harmonic speed reducer having two rigid gears. After a flexible gear F of a conventional harmonic speed reducer having two rigid gears is mounted onto an outer periphery of a wave generator WG, an outer gear structure F1 of the flexible gear F will deform. An interference issue occurs between the deformed outer gear structure F1 and two inner sides of two inner gear structures R11, R12 respectively included by the two rigid gears R1, R2 (i.e., the interference issue occurs at area A in FIG. 1). In this way, a mesh efficiency between the flexible gear F and the two rigid gears R1, R2 is decreased, so that a lifespan of the harmonic speed reducer having the two rigid gears is shortened.

SUMMARY OF THE DISCLOSURE

In response to the above-referenced technical inadequacies, the present disclosure provides a harmonic speed reducer primarily configured to improve on the low mesh efficiency and the low lifespan of a conventional harmonic speed reducer having two rigid gears.

In one aspect, the present disclosure provides a harmonic speed reducer including a wave generator, a flexible gear, and two rigid gears. The wave generator is configured to be connected to a driving unit, and the wave generator is configured to be driven by the driving unit so as to rotate relative to a central axis. The flexible gear is connected to an outer periphery of the wave generator. The flexible gear has a plurality of first outer gear structures, a plurality of second outer gear structures, and a division groove at an outer portion thereof, and the division groove is arranged between the first outer gear structures and the second outer gear structures. The two rigid gears are respectively defined as a first rigid gear and a second rigid gear. The first rigid gear has a plurality of first inner gear structures, the second rigid gear has a plurality of second inner gear structures, the first inner gear structures are configured to be engaged with the first outer gear structures, and the second inner gear structures are configured to be engaged with the second outer gear structures. A quantity of the first inner gear structures included by the first rigid gear is equal to a quantity of the first outer gear structures included by the flexible gear, and a quantity of the second inner gear structures included by the second rigid gear is greater than a quantity of the second outer gear structures included by the flexible gear. Two opposite sides of the first rigid gear are respectively defined as an inner side and an outer side, two opposite sides of the second rigid gear are respectively defined as an inner side and an outer side, the first rigid gear is disposed near the second rigid gear, and the inner side of the first rigid gear faces toward the inner side of the second rigid gear. Each of the first inner gear structures of the first rigid gear has a first top surface and four first connection surfaces, and the four first connection surfaces are connected to four edges of the first top surface. A first intersection line is defined between each of the first top surfaces and a sectional surface, and a first angle defined between the first intersection line and a first horizontal line parallel to the central axis is within a range from 0.1 degrees to 5 degrees. A straight-line distance between the first intersection line and the central axis at the sectional surface gradually decreases from the inner side of the first rigid gear to the outer side of the first rigid gear, a normal direction of the sectional surface is perpendicular to the central axis, and the central axis passes through the sectional surface.

Therefore, in the harmonic speed reducer provided by the present disclosure, by the design of the first angle, the second angle, and the division groove, the mesh efficiency between the first outer gear structures of the flexible gear and the first inner gear structures of the first rigid gear can be increased, and the mesh efficiency between the second outer gear structures of the flexible gear and the second inner gear structures of the second rigid gear can be increased, thereby prolonging the lifespan of the harmonic speed reducer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
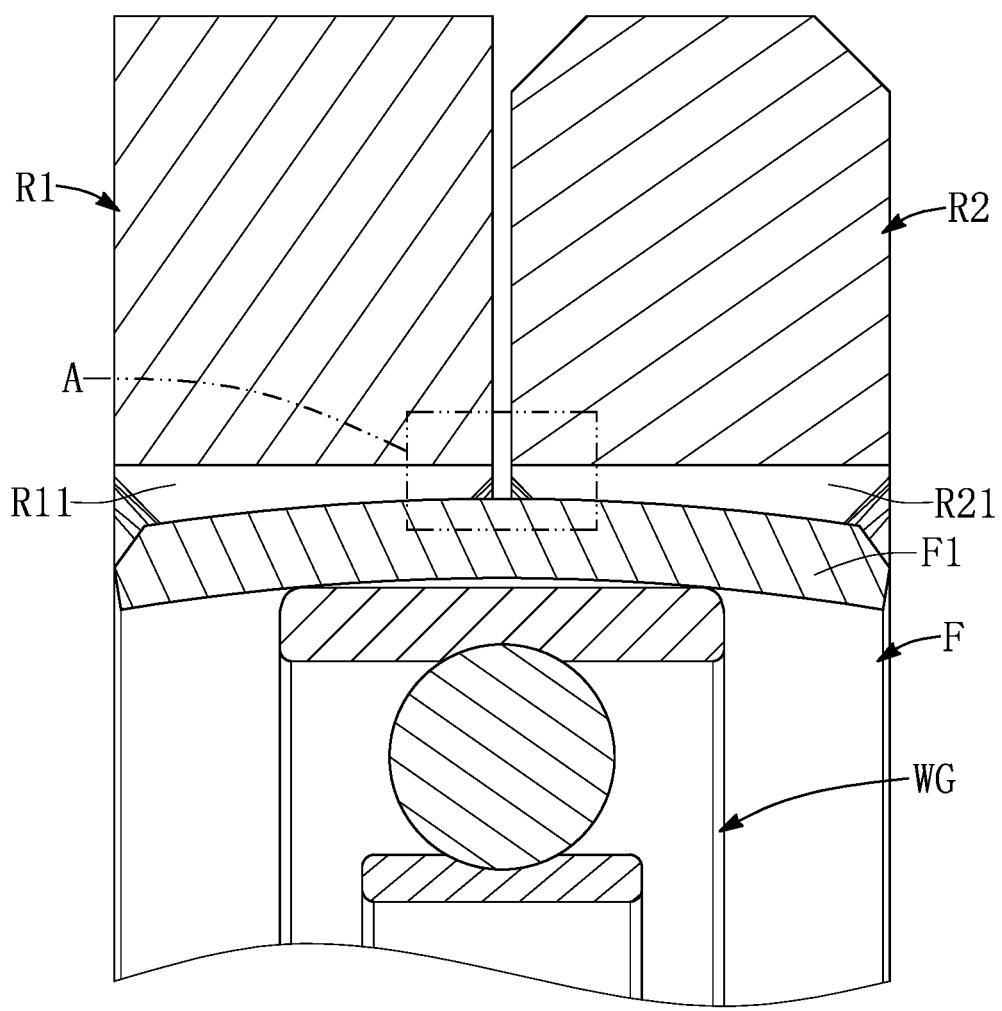
FIG. 1 is a schematic partial cross-sectional view of a conventional harmonic speed reducer having two rigid gears.
Figure 2:
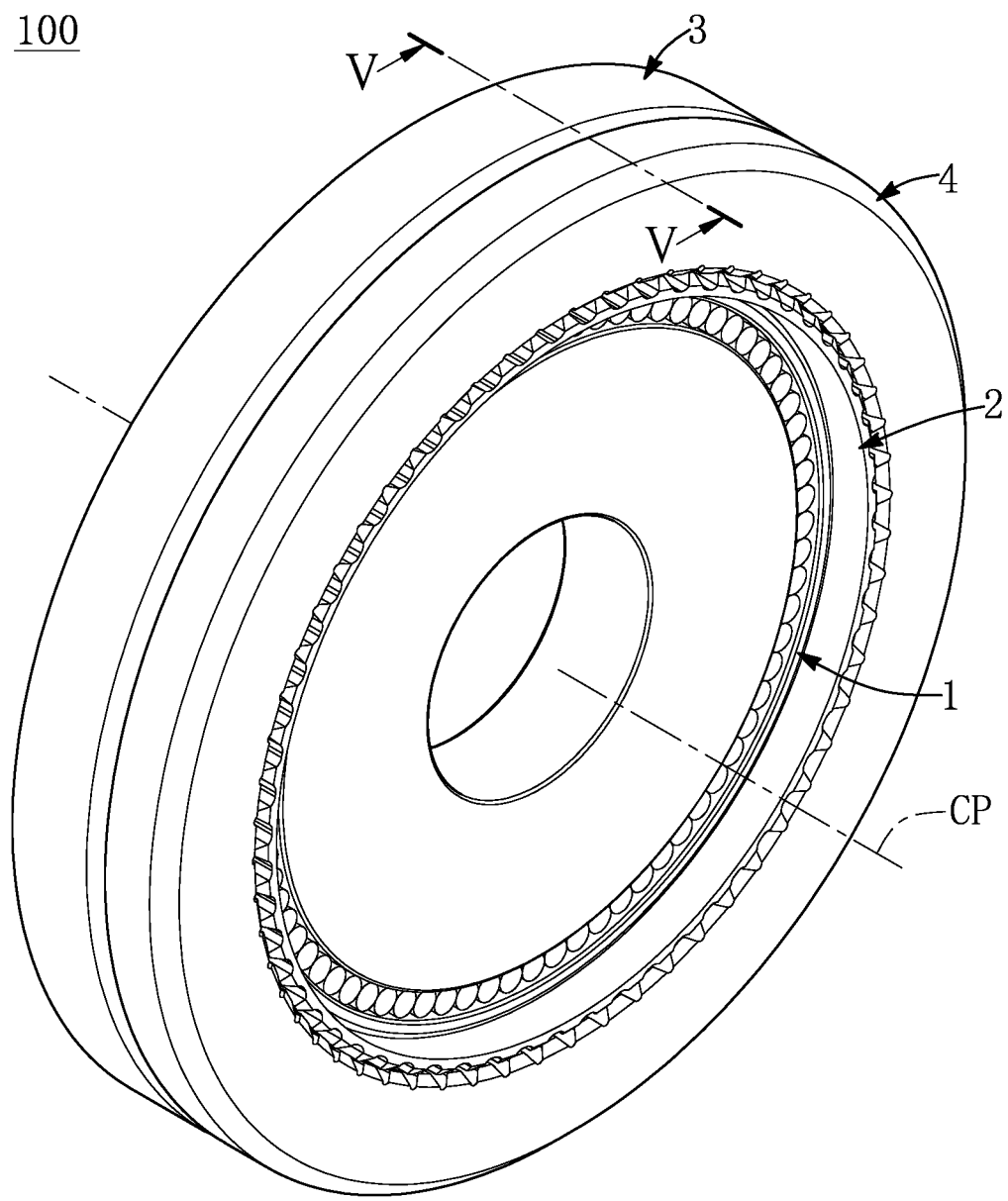
FIG. 2 is a schematic view of a harmonic speed reducer according to the present disclosure.
Figure 3:
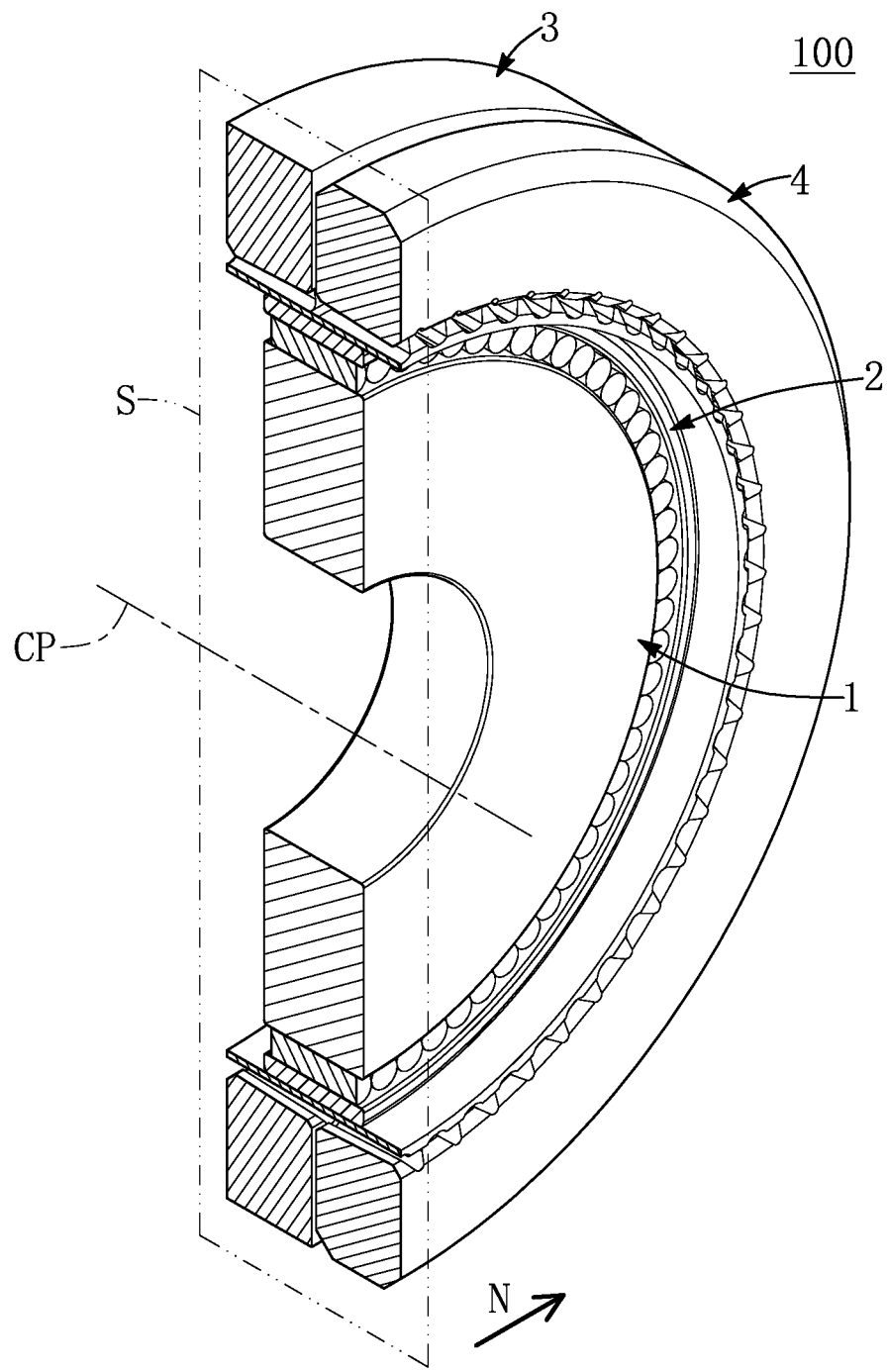
FIG. 3 is a schematic cross-sectional view of the harmonic speed reducer according to the present disclosure.
Figure 4:
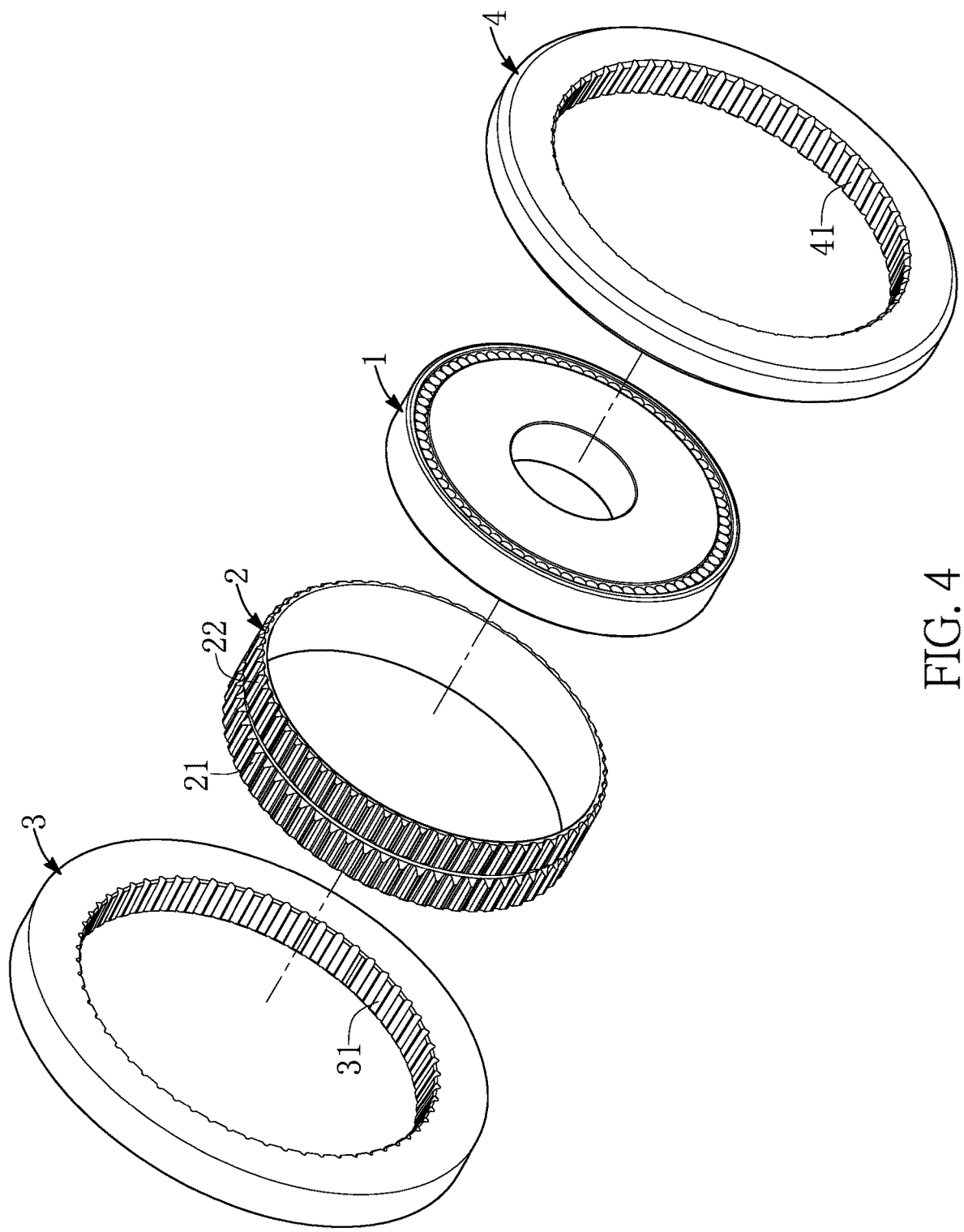
FIG. 4 is a schematic exploded view of the harmonic speed reducer according to the present disclosure.
Figure 5:
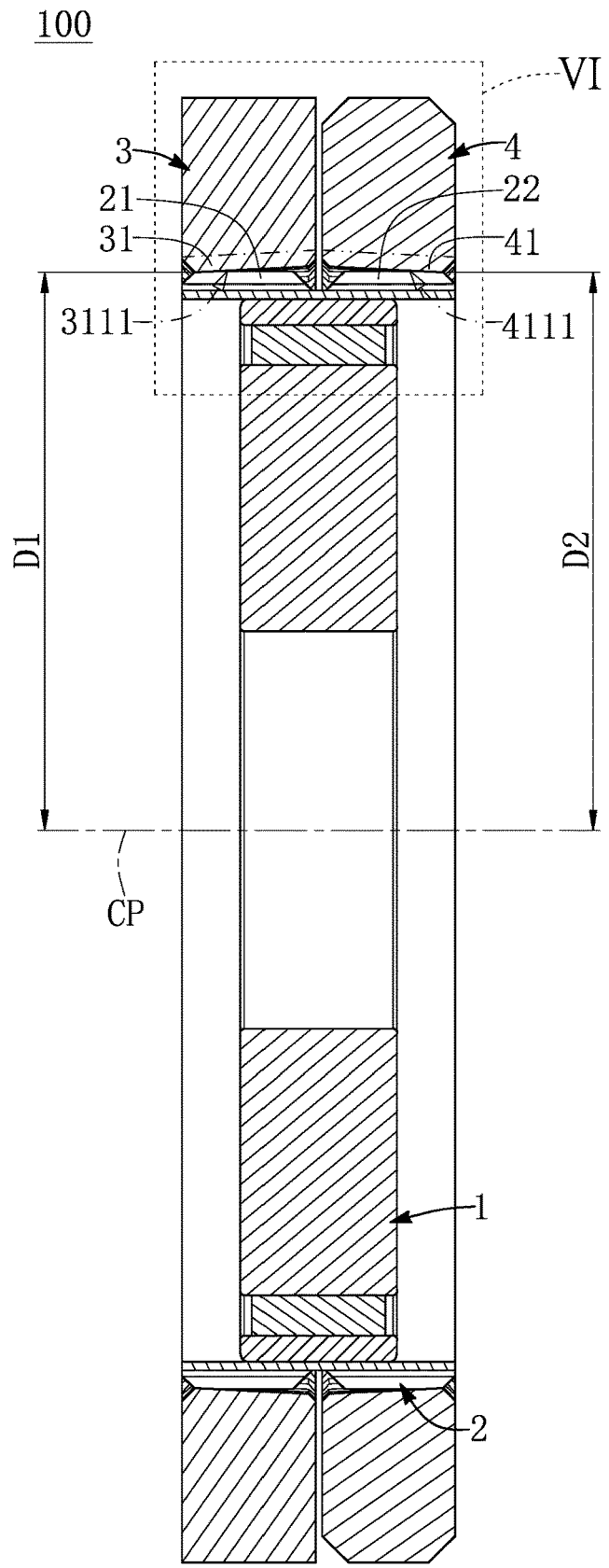
FIG. 5 is a schematic cross-sectional view taken along line V-V of FIG. 2.
Figure 6:
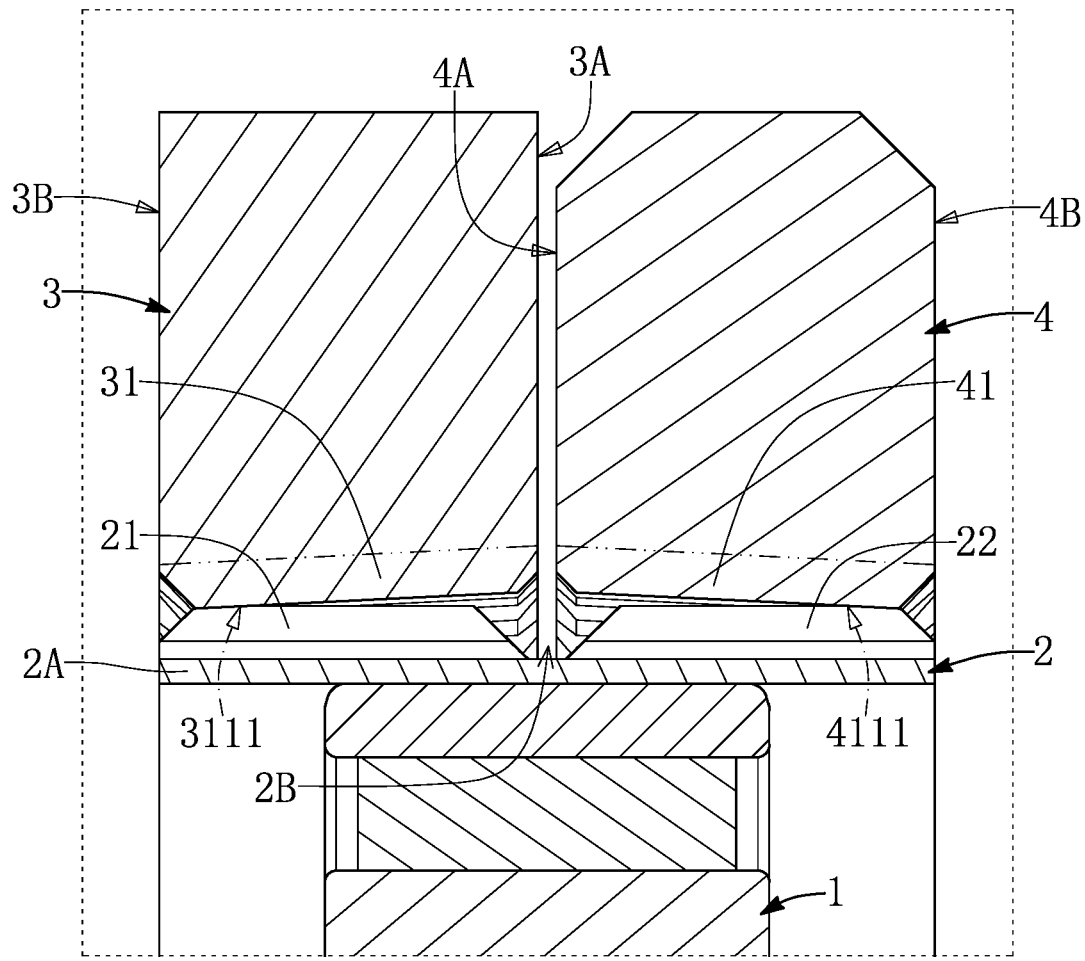
FIG. 6 is a partial enlarged schematic view of FIG. 5.
Figure 7:
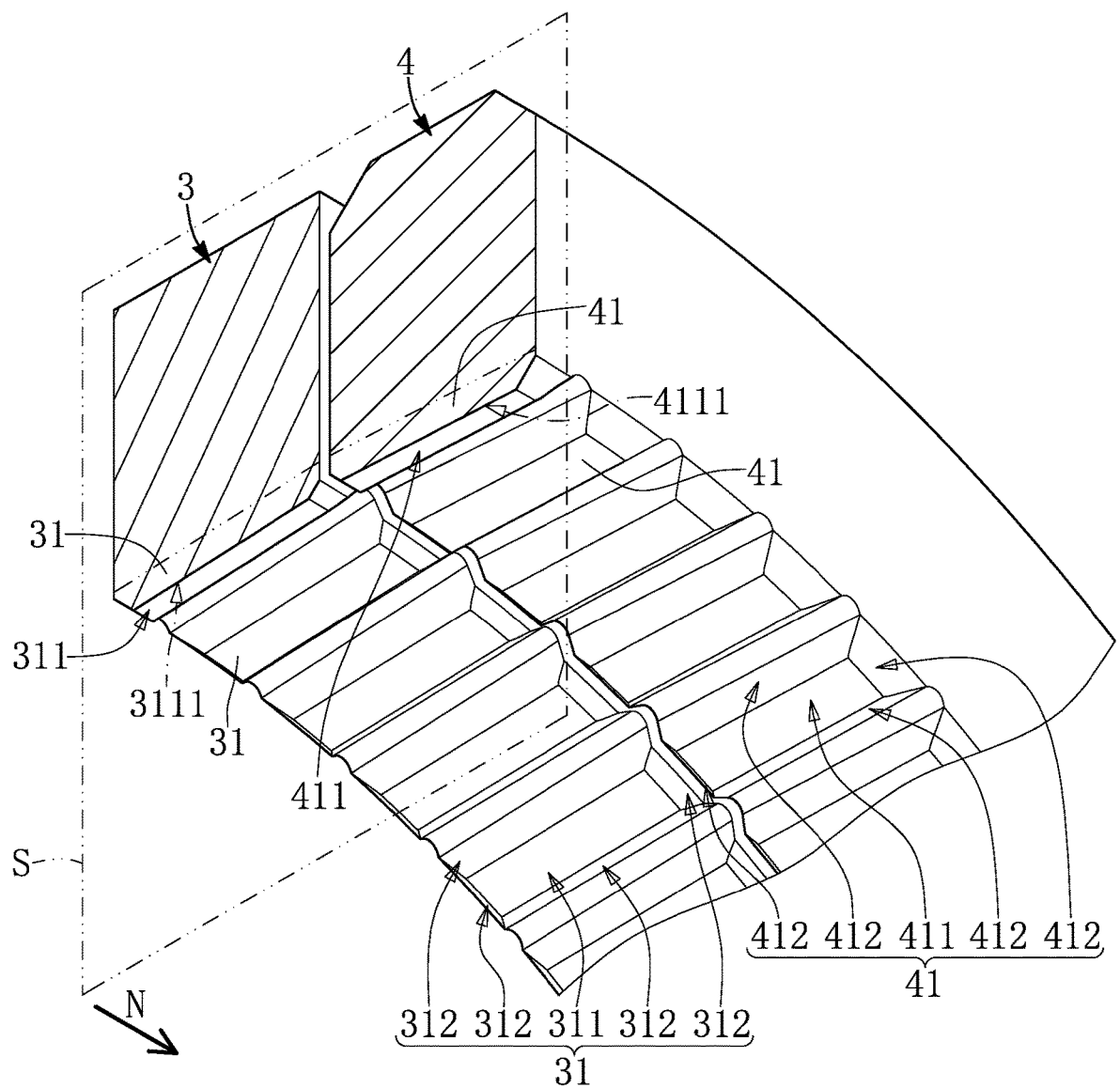
FIG. 7 a schematic partial cross-sectional view of a first rigid gear and a second rigid gear of the harmonic speed reducer according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 2 to FIG. 6, a harmonic speed reducer 100 of the present disclosure includes a wave generator 1, a flexible gear 2, and two rigid gears. The flexible gear 2 is disposed at an outer periphery of the wave generator 1, and the two rigid gears are disposed at an outer periphery of the flexible gear 2. For ease of illustration, the two rigid gears are respectively defined as a first rigid gear 3 and a second rigid gear 4, and a plurality of inner gear structures included by the first gear 3 and a plurality of inner gear structures included by the second gear 4 are respectively defined as a plurality of first inner gear structures 31 and a plurality of second inner gear structures 41.

The wave generator 1 is configured to be connected to a driving unit (e.g., a shaft of a motor or a rotor of a motor), and the wave generator 1 is configured to be driven by the driving unit so as to rotate relative to a central axis CP.

The flexible gear 2 is connected to the outer periphery of the wave generator 1, and the flexible gear 2 defines an annular main body 2A. Each of the first outer gear structures 21 is formed at an outer periphery of the annular main body 2A, each of the second outer gear structures 22 is formed at the outer periphery of the annular main body 2A, and a division groove 2B is formed between the first outer gear structures 21 and the second outer gear structures 22.

In an embodiment of the present disclosure, a structure of each of the first outer gear structures 21 can be entirely the same as a structure of each of the second outer gear structures 22, and a quantity of the first outer gear structures 21 included by the flexible gear 2 can be equal to a quantity of the second outer gear structures 22 included by the flexible gear 2, but the present disclosure is not limited thereto. In other embodiments of the present disclosure, the structure of each of the first outer gear structures 21 can be different from the structure of each of the second outer gear structures 22. For example, each of the first outer gear structures 21 can have a straight gear structure, and each of the second outer gear structures 22 does not have a straight gear structure.

The first rigid gear 3 includes a plurality of first inner gear structures 31, and the first inner gear structures 31 included by the first rigid gear 3 are configured to be engaged with the first outer gear structures 21 of the flexible gear 2. The second rigid gear 4 includes a plurality of second inner gear structures 41, and the second inner gear structures 41 included by the second rigid gear 4 are configured to be engaged with the second outer gear structures 22 of the flexible gear 2. In a practical application, the second rigid gear 4 can be connected to an external output component. For example, the second rigid gear 4 can be directly or indirectly connected to components such as wheels or robotic arms.

The first rigid gear 3 is disposed near the second rigid gear 4, two opposite sides of the first rigid gear 3 are respectively defined as an inner side 3A and an outer side 3B, two opposite sides of the second rigid gear 4 are respectively defined as an inner side 4A and an outer side 4B, and the inner side 3A of the first rigid gear 3 faces toward the inner side 4A of the second rigid gear 4.

According to the above, in a practical application, the quantity of the first outer gear structures 21 included by the flexible gear 2 can be equal to the quantity of the second outer gear structures 22 included by the flexible gear 2, a quantity of the first inner gear structures 31 included by the first rigid gear 3 can be equal to the quantity of the first outer gear structures 21 included by the flexible gear 2, and a quantity of the second inner gear structures 41 included by the second rigid gear 4 can be greater than the quantity of the second outer gear structures 22 included by the flexible gear 2.

Moreover, when the driving unit drives the wave generator 1 to be operated, the wave generator 1 drives the flexible gear 2 to repeatedly and flexibly deform, and one portion of the first outer gear structures 21 of the flexible gear 2 is engaged with one portion of the inner gear structures 31 of the first rigid gear 3. Since the quantity of the first inner gear structures 31 included by the first rigid gear 3 is equal to the quantity of the first outer gear structures 21 included by the flexible gear 2, when the flexible gear 2 repeatedly and flexibly deforms, the flexible gear 2 does not rotate relative to the first rigid gear 3, and parts of the second outer gear structures 22 of the flexible gear 2 that repeatedly and flexibly deforms are engaged with parts of the second inner gear structures 41 of the second rigid gear 4. Since the quantity of the second outer gear structures 22 included by the flexible gear 2 is different from the quantity of second inner gear structures 41 of the second rigid gear 4, the second rigid gear 4 is driven to rotate by the flexible gear 2 that repeatedly and flexibly deforms. In this way, a power inputted by the driving unit that rotates in a high rotational speed is outputted by the second rigid gear 4 that rotates in a relatively low rotational speed.

Referring to FIG. 4 to FIG. 8, each of the first inner gear structures 31 of the first rigid gear 3 has a first top surface 311 and four first connection surfaces 312, and the four first connection surfaces 312 are connected to four edges of the first top surface 311. A first intersection line 3111 is defined between each of the first top surfaces 311 and a sectional surface S, and a first angle $\theta_1$ between the first intersection line 3111 and a first horizontal line H1 parallel to the central axis CP is within a range from 0.1 degrees to 5 degrees. At the sectional surface S, a straight-line distance between the first intersection line 3111 and the central axis CP gradually decreases from the inner side 3A of the first rigid gear 3 to the outer side 3B of the first rigid gear 3, a normal direction N of the sectional surface S is perpendicular to the central axis CP, and the central axis CP passes through the sectional surface S.

Similarly, each of the second inner gear structures 41 of the second rigid gear 4 has a second top surface 411 and four second connection surfaces 412, and the four second connection surfaces 412 are connected to four edges of the second top surface 411. A second intersection line 4111 is defined between each of the second top surfaces 411 and the sectional surface S, and a second angle $\theta_2$ between the second intersection line 4111 and a second horizontal line H2 parallel to the central axis CP is within a range from 0.1 degrees to 5 degrees. At the sectional surface S, a straight-line distance between the second intersection line 4111 and the central axis CP gradually decreases from the inner side 4A of the second rigid gear 4 to the outer side 4B of the second rigid gear 4.

According to the above, through the first angle $\theta_1$, the second angle $\theta_2$, and the division groove 2B, the flexible gear 2 can be maintained to be axially positioned, thereby increasing a mesh efficiency between the flexible gear 2 and each of the two rigid gears and increasing a carrying capacity of the harmonic speed reducer 100. Moreover, an overall lifespan of the harmonic speed reducer 100 can be prolonged.

Referring to FIG. 1, FIG. 2, FIG. 4, and FIG. 5, in a conventional harmonic speed reducer Q, a flexible gear F does not have the division groove 2B of the flexible gear 2 of the present disclosure at an outer periphery of the flexible gear F, and when the conventional flexible gear F is mounted onto the outer periphery of the wave generator WG, an outer gear structures F1 of the flexible gear F will have a relatively obvious deformation. In addition, when two rigid gears R1, R2 are assembled with the flexible gear F, since the outer gear structures F1 of the flexible gear F already deform, the flexible gear F easily axially moves. Therefore, a mesh efficiency of inner gear structures R11, R21 of the two rigid gears R1, R2 and the outer gear structures F1 of the flexible gear F is poor, and a lifespan of the harmonic speed reducer Q accordingly decreases.

Figure 8:
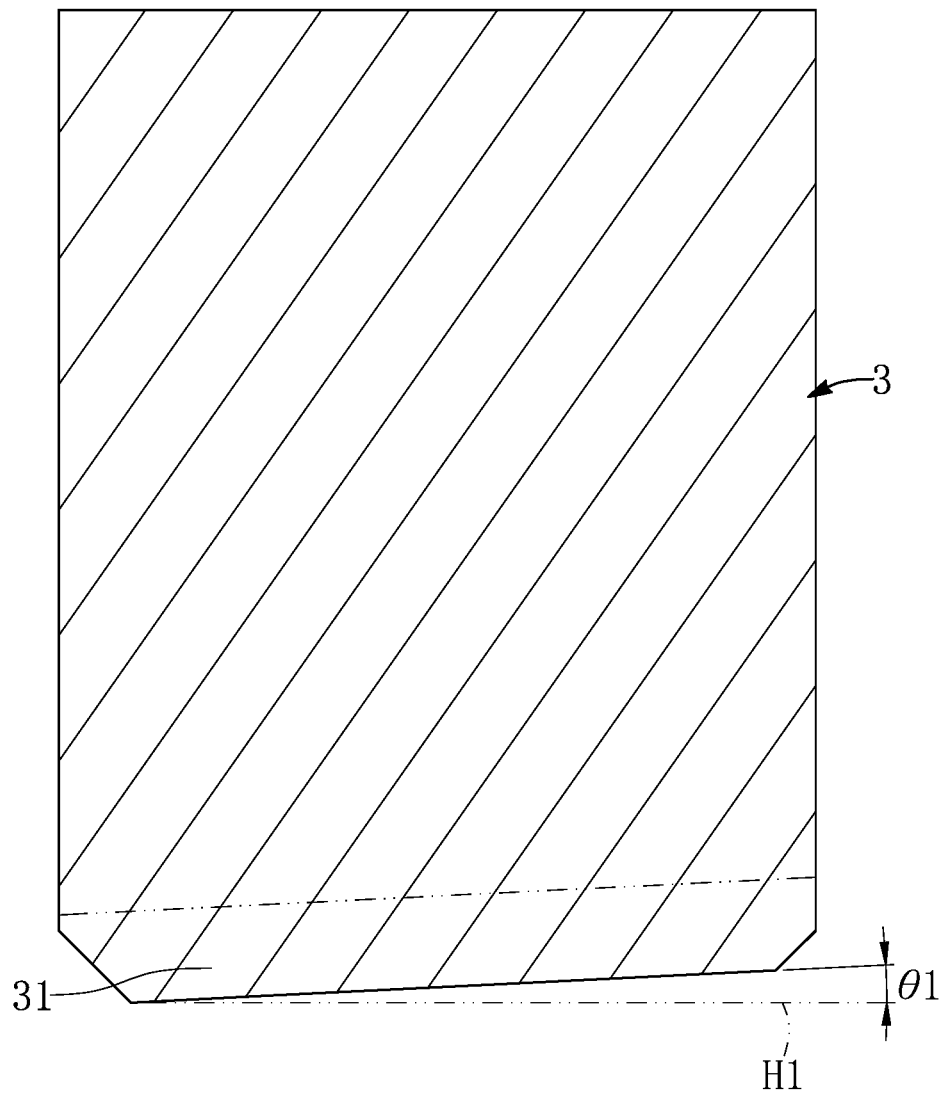
FIG. 8 is a schematic partial cross-sectional view of the first rigid gear of the harmonic speed reducer according to the present disclosure.
Figure 9:
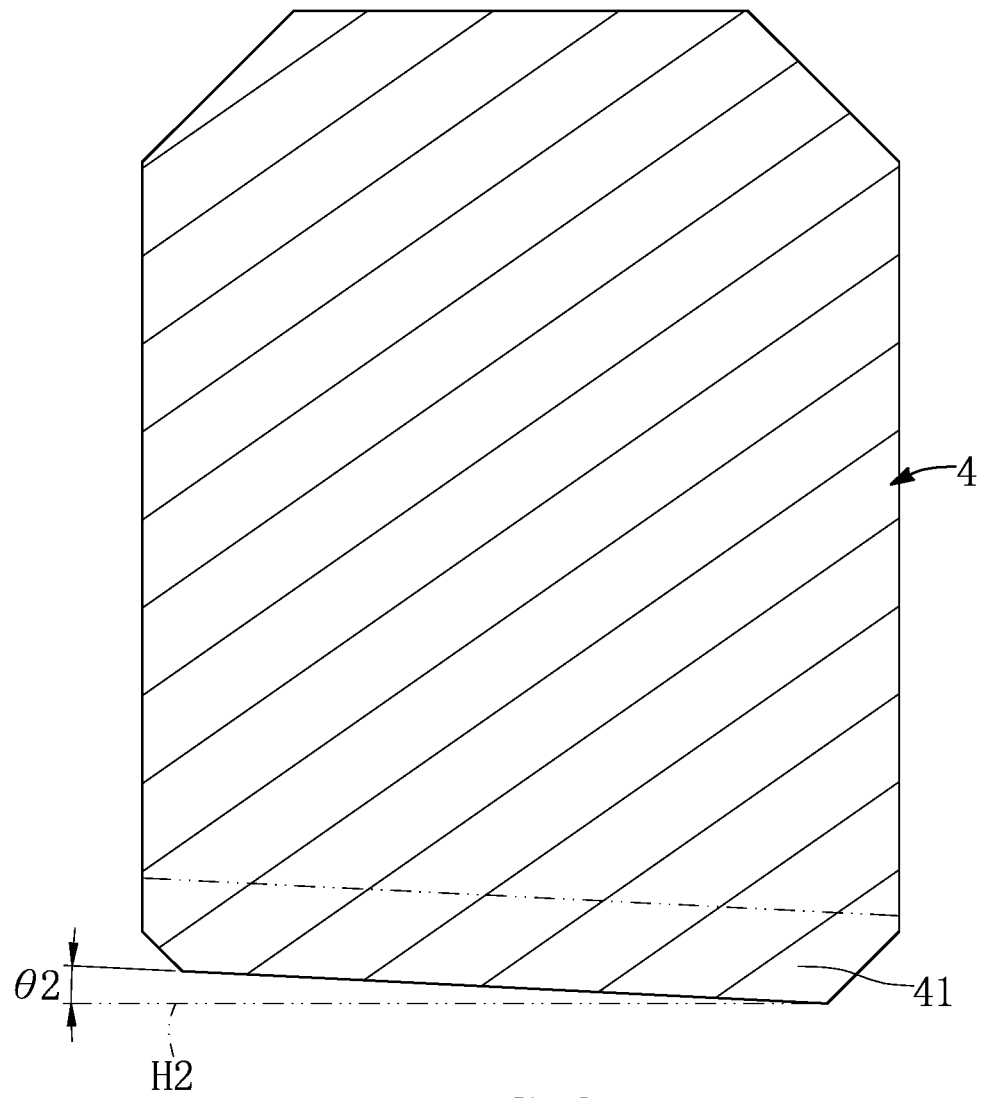
FIG. 9 is a schematic partial cross-sectional view of the second rigid gear of the harmonic speed reducer according to the present disclosure.
Figure 10:
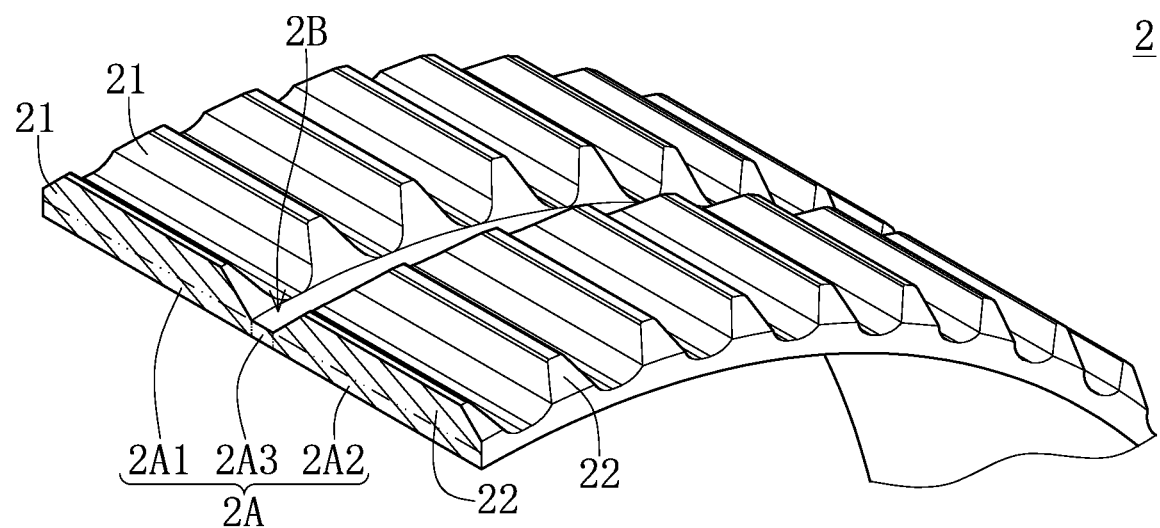
FIG. 10 is a schematic partial cross-sectional view of a flexible gear of the harmonic speed reducer according to the present disclosure.
Figure 11:
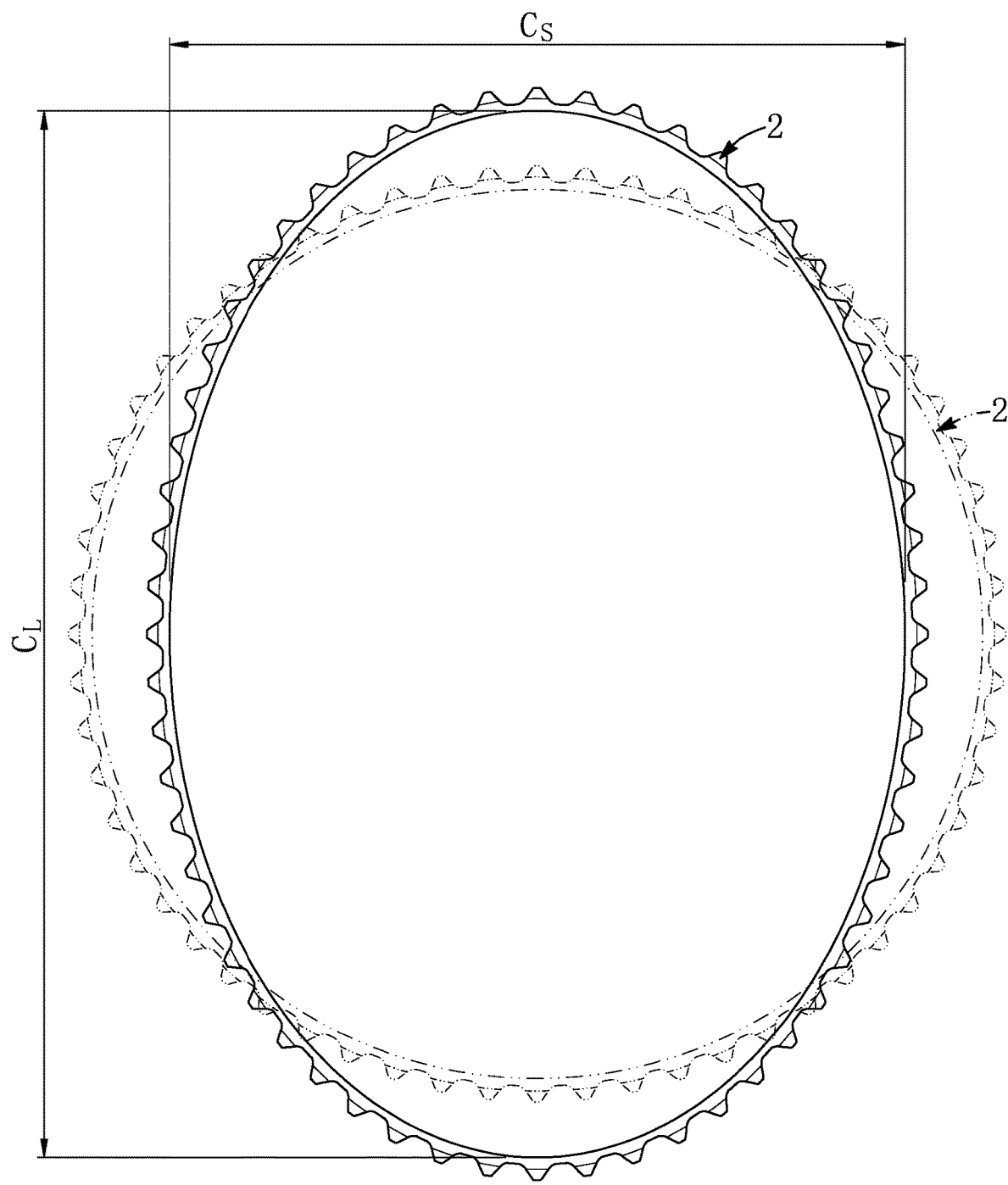
FIG. 11 is a schematic view showing the flexible gear of the harmonic speed reducer before and after deformation according to the present disclosure.
Figure 12:
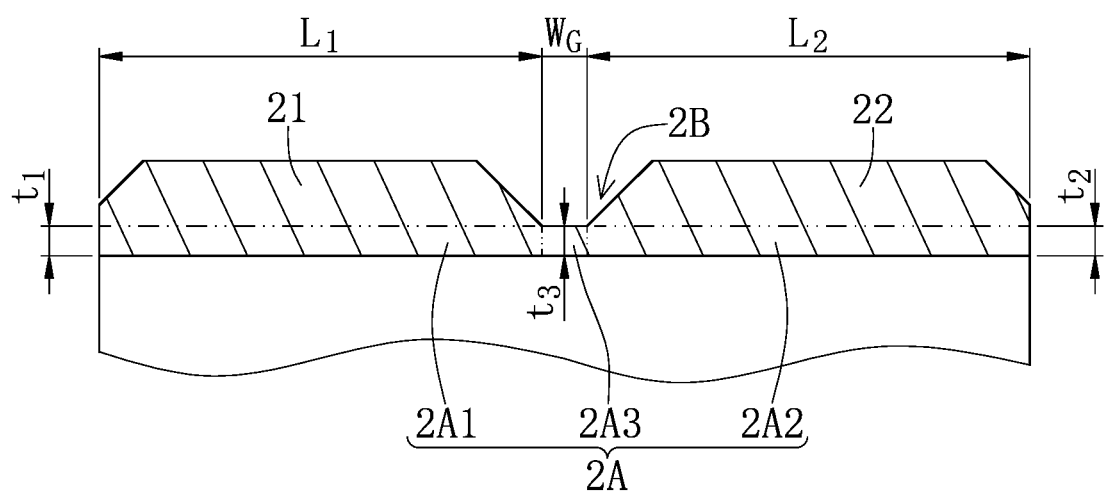
FIG. 12 a schematic partial cross-sectional view of the flexible gear of the harmonic speed reducer according to the present disclosure.
Figure 13:
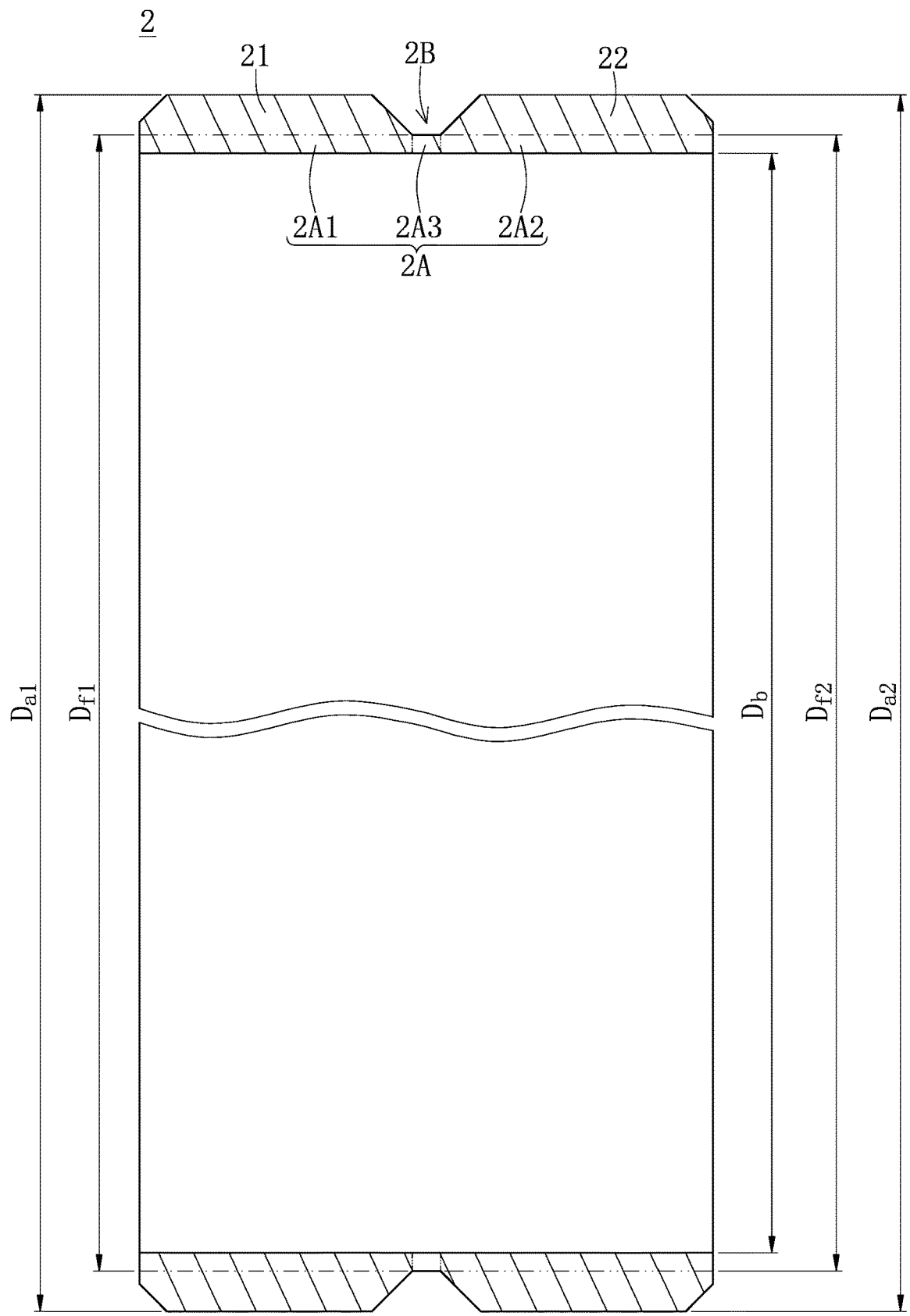
FIG. 13 is a schematic cross-sectional view of the harmonic speed reducer according to the present disclosure.

In addition, since the outer gear structures F1 of the flexible gear F of the conventional harmonic speed reducer Q have relatively obvious deformation, when the conventional harmonic speed reducer Q is operated, the flexible gear F easily shakes left and right. Conversely, in the harmonic speed reducer 100 of the present disclosure, through the division groove 2B of the flexible gear 2 and the design of the first angle $\theta_1$ (as shown in FIG. 8) and the second angle $\theta_2$ (as shown in FIG. 9), when the harmonic speed reducer 100 is operated, the flexible gear 2 does not easily shake left and right.

Referring to FIG. 7 to FIG. 12, in a preferable embodiment, a maximum radial dimension of the flexible gear 2 when the flexible gear 2 is driven by the wave generator 1 to deform is defined as a long axis of the flexible gear 2, and a minimum radial dimension of the flexible gear 2 when the flexible gear 2 is driven by the wave generator 1 to deform is defined as a short axis of the flexible gear 2. When the long axis of the flexible gear 2 is defined as $C_L$, the short axis of the flexible gear 2 is defined as $C_S$. A first gear surface width of each of the first inner gear structures 31 is defined as $L_1$, the first angle is defined as $\theta_1$, a second gear surface width of each of the second inner gear structures 41 is defined as $L_2$, and the second angle is defined as $\theta_2$. $C_L$, $C_S$, $L_1$, and $\theta_1$ satisfy an equation of $\theta_1 = C_1 * \tan^{-1}((C_L - C_S)/(4 * L_1))$, and $0.08 \leq C_1 \leq 0.45$; $C_L$, $C_S$, $L_2$, and $\theta_2$ satisfy an equation of $\theta_2 = C_2 * \tan^{-1}((C_L - C_S)/(4 * L_2))$, and $0.08 \leq C_2 \leq 0.45$. In this way, the flexible gear 2, the first rigid gear 3, and the second rigid gear 4 can achieve better mesh efficiency.

Referring to FIG. 7 to FIG. 13, in a preferable embodiment, the flexible gear 2 defines a first annular portion 2A1, a second annular portion 2A2, and a connecting annular portion 2A3. One side of the first annular portion 2A1 is connected to one side of the connecting annular portion 2A3, another side of the connecting annular portion 2A3 is connected to the second annular portion 2A2, and the first outer gear structures 21 are formed at an outer periphery of the first annular portion 2A1. The second outer gear structures 22 are formed at an outer periphery of the second annular portion 2A2, and an outer periphery of the connecting annular portion 2A3, the first outer gear structures 21, and the second outer gear structures 22 jointly defines the division groove 2B.

Moreover, an addendum circle diameter of each of the first outer gear structures 21 is defined as $D_{a1}$, and a dedendum circle diameter of each of the first outer gear structures 21 is defined as Dn. An addendum circle diameter of each of the second outer gear structures 22 is defined as $D_{a2}$, a dedendum circle diameter of each of the second outer gear structures 22 is defined as $D_{f2}$, and a width of the division groove 2B is defined as $W_G$. When $D_{f1} < D_{f2}$, $D_{f1}$, $D_{a2}$, and $W_G$ satisfy an equation as follows:

$$W_G = -\sqrt{R^2 - \left(R - \left(\frac{D_{a2} - D_{f1}}{2}\right)\right)^2},$$

in which $3.5 \leq R \leq 20.8$.

When $D_{f1} > D_{f2}$, $D_{f2}$, $D_{a1}$, and $W_G$ satisfy an equation as follows:

$$W_G = \sqrt{R^2 - \left(R - \left(\frac{D_{a1} - D_{f2}}{2}\right)\right)^2},$$

in which $3.5 \leq R \leq 20.8$.

A thickness of the first annular portion 2A1 is defined as $t_1$, a thickness of the second annular portion 2A2 is defined as $t_2$, and a thickness of the connecting annular portion 2A3 is defined as $t_3$. An inner diameter of the flexible gear 2 is defined as $D_b$, $t_1=(D_{f1}-D_b)/2$, and $t_2=(D_{f2}-D_b)/2$. When $t_1<t_2$, $t_1 \le t_3 \le t_2$, and when $t_1>t_2$, $t_2 \le t_3 \le t_1$.

According to the above, by the above design, the flexible gear 2, the first rigid gear 3, and the second rigid gear 4 can achieve relatively good mesh efficiency.

Beneficial Effects of the Embodiment

In conclusion, in the harmonic speed reducer of the present disclosure, by the design of the first angle, the second angle, and the division groove, the mesh efficiency between the first outer gear structures of the flexible gear and the first inner gear structures of the first rigid gear can be increased, and the mesh efficiency between the second outer gear structures of the flexible gear and the second inner gear structures of the second rigid gear can be increased, thereby prolonging the lifespan of the harmonic speed reducer. In addition, since the first angle, the second angle, and the flexible gear satisfies the above-mentioned equations, the mesh efficiency between the flexible gear and the first rigid gear and the mesh efficiency between the flexible gear and the second rigid gear can be further increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A harmonic speed reducer, comprising:
   a wave generator configured to be connected to a driving unit, wherein the wave generator is configured to be driven by the driving unit so as to rotate relative to a central axis;
   a flexible gear connected to an outer periphery of the wave generator, wherein the flexible gear has a plurality of first outer gear structures, a plurality of second outer gear structures, and a division groove at an outer portion thereof, and the division groove is arranged between the first outer gear structures and the second outer gear structures; and
   two rigid gears respectively defined as a first rigid gear and a second rigid gear, wherein the first rigid gear has a plurality of first inner gear structures, the second rigid gear has a plurality of second inner gear structures, the first inner gear structures are configured to be engaged with the first outer gear structures, and the second inner gear structures are configured to be engaged with the second outer gear structures; wherein a quantity of the first inner gear structures included by the first rigid gear is equal to a quantity of the first outer gear structures included by the flexible gear, and a quantity of the second inner gear structures included by the second rigid gear is greater than a quantity of the second outer gear structures included by the flexible gear; wherein two opposite sides of the first rigid gear are respectively defined as an inner side and an outer side, two opposite sides of the second rigid gear are respectively defined as an inner side and an outer side, the first rigid gear is disposed near the second rigid gear, and the inner side of the first rigid gear faces toward the inner side of the second rigid gear; wherein each of the first inner gear structures of the first rigid gear has a first top surface and four first connection surfaces, and the four first connection surfaces are connected to four edges of the first top surface; wherein a first intersection line is defined between each of the first top surfaces and a sectional surface, and a first angle defined between the first intersection line and a first horizontal line parallel to the central axis is within a range from 0.1 degrees to 5 degrees; and wherein a straight-line distance between the first intersection line and the central axis at the sectional surface gradually decreases from the inner side of the first rigid gear to the outer side of the first rigid gear, a normal direction of the sectional surface is perpendicular to the central axis, and the central axis passes through the sectional surface.

2. The harmonic speed reducer according to claim 1, wherein a maximum radial dimension of the flexible gear when the flexible gear is driven by the wave generator to deform is defined as a long axis of the flexible gear, and a minimum radial dimension of the flexible gear when the flexible gear is driven by the wave generator to deform is defined as a short axis of the flexible gear, and wherein the long axis of the flexible gear is defined as $C_L$, the short axis of the flexible gear is defined as $C_S$, a first gear surface width of each of the first inner gear structures is defined as $L_1$, and the first angle is defined as $\theta_1$, in which $C_L$, $C_S$, $L_1$, and $\theta_1$ satisfy an equation of $\theta_1 = C_1 * \tan^{-1}((C_L - C_S)/(4*L_1))$, and $0.08 \le C_1 \le 0.45$.

3. The harmonic speed reducer according to claim 1, wherein each of the second inner gear structures of the second rigid gear has a second top surface and four second connection surfaces, and the four second connection surfaces are connected to four edges of the second top surface; wherein a second intersection line is defined between each of the second top surfaces and a sectional surface, and a second angle defined between the second intersection line and a second horizontal line parallel to the central axis is within a range from 0.1 degrees to 5 degrees, and wherein a straight-line distance between the second intersection line and the central axis at the sectional surface gradually decreases from the inner side of the second rigid gear to the outer side of the second rigid gear.

4. The harmonic speed reducer according to claim 3, wherein a maximum radial dimension of the flexible gear when the flexible gear is driven by the wave generator to deform is defined as a long axis of the flexible gear, and a minimum radial dimension of the flexible gear when the flexible gear is driven by the wave generator to deform is defined as a short axis of the flexible gear, and wherein the long axis of the flexible gear is defined as $C_L$, the short axis of the flexible gear is defined as $C_S$, a second gear surface width of each of the second inner gear structures is defined as $L_2$, and the second angle is defined as $\theta_2$, in which $C_L$, $C_S$, $L_2$, and $\theta_2$ satisfy an equation of $\theta_2 = C_2 * \tan^{-1}((C_L - C_S)/(4*L_2))$, and $0.08 \le C_2 \le 0.45$.

5. The harmonic speed reducer according to claim 1, wherein the flexible gear defines an annular main body, each of the first outer gear structures is formed at an outer periphery of the annular main body, each of the second outer gear structures is formed at the outer periphery of the annular main body, and the division groove is formed between the first outer gear structures and the second outer gear structures.

6. The harmonic speed reducer according to claim 5, wherein an addendum circle diameter of each of the first outer gear structures is defined as $D_{a1}$, and a dedendum circle diameter of each of the first outer gear structures is defined as $D_{f1}$; wherein an addendum circle diameter of each of the second outer gear structures is defined as $D_{a2}$, a dedendum circle diameter of each of the second outer gear structures is defined as $D_{f2}$, and a width of the division groove is defined as $W_G$, wherein, when $D_{f1} < D_{f2}$, $D_{f1}$, $D_{a2}$, and $W_G$ satisfy an equation as follows:

$$W_G = \sqrt{R^2 - \left(R - \left(\frac{D_{a2} - D_{f1}}{2}\right)\right)^2},$$

in which $3.5 \leq R \leq 20.8$;

wherein, when $D_{f1} > D_{f2}$, $D_{a1}$, $D_{f2}$, and $W_G$ satisfy an equation as follows:

$$W_G = \sqrt{R^2 - \left(R - \left(\frac{D_{a1} - D_{f2}}{2}\right)\right)^2},$$

in which $3.5 \leq R \leq 20.8$; and wherein the flexible gear defines a first annular portion, a second annular portion, and a connecting annular portion, one side of the first annular portion is connected to one side of the connecting annular portion, another side of the connecting annular portion is connected to the second annular portion, the first outer gear structures are formed at an outer periphery of the first annular portion, the second outer gear structures are formed at an outer periphery of the second annular portion, and an outer periphery of the connecting annular portion, the first outer gear structures, and the second outer gear structures jointly define the division groove;

wherein a thickness of the first annular portion is defined as $t_1$, a thickness of the second annular portion is defined as $t_2$, a thickness of the connecting annular portion is defined as $t_3$, and an inner diameter of the flexible gear is defined as $D_b$; wherein $t_1 = (D_{f1} - D_b)/2$, and $t_2 = (D_{f2} - D_b)/2$; and wherein, when $t_1 < t_2$, $t_1 \leq t_3 \leq t_2$, and when $t_1 > t_2$, $t_2 \leq t_3 \leq t_1$.

7. The harmonic speed reducer according to claim 1, wherein each of the first outer gear structures and any one of the second outer gear structures have a same structure.

8. The harmonic speed reducer according to claim 1, wherein each of the first outer gear structures and any one of the second outer gear structures do not have a same structure, and each of the first outer gear structures or each of the second outer gear structures has a straight gear structure.

* * * * *